UNITED STATES PATENT OFFICE.

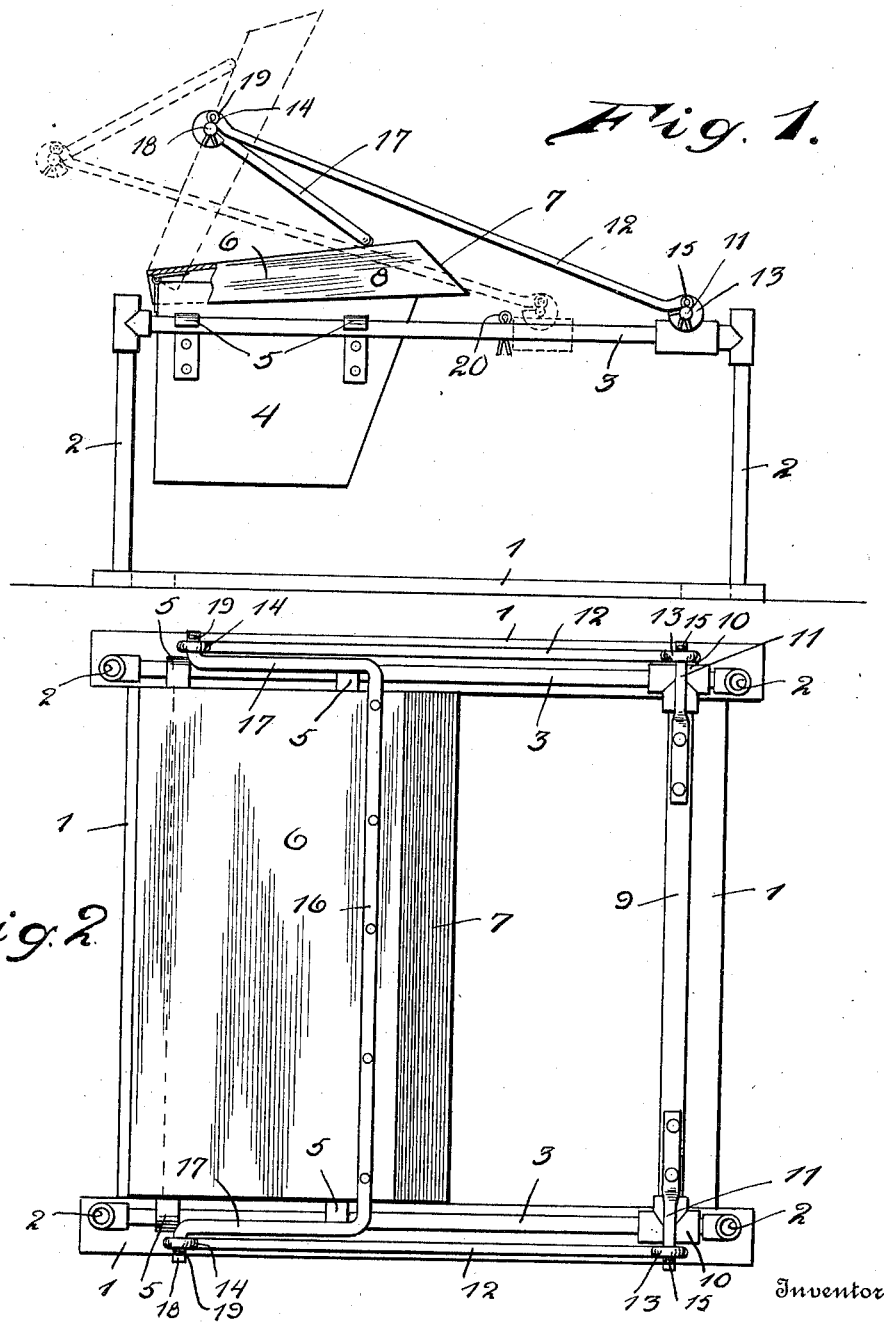

WILLIAM A. COGDILL, OF STANBERRY, MISSOURI.

SALT-TROUGH.

1,036,962.     Specification of Letters Patent.     Patented Aug. 27, 1912.

Application filed September 14, 1911. Serial No. 649,369.

*To all whom it may concern:*

Be it known that I, WILLIAM A. COGDILL, a citizen of the United States, residing at Stanberry, in the county of Gentry and State of Missouri, have invented certain new and useful Improvements in Salt-Troughs, of which the following is a specification.

My invention relates to devices for supplying salt to live stock and has for its object the provision of a trough so constructed as to prevent waste of the salt by rain and snow as well as by being nosed or pawed out of the trough by the animal.

To this end my invention consists in the construction of a trough having a hinged cover and providing means operated by the animal when approaching the trough to lift the cover, the cover being returned to its closed position by gravity when the animal moves away from the trough.

My invention will be described in detail hereinafter and illustrated in the accompanying drawings in which—

Figure 1 is a side view in elevation of my improved trough showing the cover in a closed position in full lines and in broken lines showing the cover open, and Fig. 2, a top plan view.

In the drawings similar reference characters will be used to designate corresponding parts in the several views.

1 indicates a suitable base frame having the posts 2 secured thereto and 3 designates parallel horizontal bars connecting the posts 2.

The salt trough 4 is provided with ears 5 at its ends that engage bars 3 to removably support the trough thereon, and has a cover 6 hinged on its rear margin; said cover having an inclined flange 7 on its front edge that engages the front margin of the trough when closed to give the hinged portion of the trough a pitch downwardly, and side flanges 8 that extend below the upper side margins of the trough when the cover is in its closed position. This construction of cover forms an effectual water-shed for the trough to prevent waste of the salt from rain and snow, as well as to prevent stock from licking the salt unless the cover is raised by the instrumentalities to be hereinafter described.

9 indicates a cross-bar having tubular bearing members 10 on its ends that are slidably mounted on horizontal bars 3, and 11 indicates pins secured to the bar and extending beyond the ends of the bar.

12 indicates rods having eye loops 13, 14 on their ends, eye loops 13 being mounted on pins 11 and secured in place by split pins 15 or their equivalent.

16 indicates a rod secured to cover 6 and having its upwardly extending ends 17 formed with lateral lugs or projections 18 that pivotally engage eye loops 14 on rods 12 and are secured from displacement thereon by means of split pins 19 or their equivalent.

In operation my improved salt trough may be placed wherever desired so that it is accessible to the live stock and the cover is opened by an animal approaching the trough from the front and pushing against cross-bar 9. As the cross-bar 9 is moved toward trough 4 by the animal the cover is lifted by the rods 12 engaging cross-bar 9 and the ends of rod 16 secured to the cover, so that the animal has access to the salt contained in the trough, and when pressure on cross-bar 9 is relieved, by the animal turning from the trough, the weight of the cover causes it to reseat itself on the trough and restore the cross-bar to its original position.

20 indicates stops secured to bars 3 to limit the movement of cross-bar 9 when being moved to open the cover.

It will be understood that by hinging the cover so that it swings rearwardly it forms a rear wall when in an open position to prevent the animal from nosing the salt out of the trough, and the cross-bar 9 forms an effectual barrier to prevent the animal from lifting its foreleg to paw the contents of the trough.

Having thus described my invention what I claim is—

1. In a salt trough, parallel horizontal bars spaced apart and lying in the same horizontal plane, a trough mounted on said bars, a cross-bar slidably mounted on said bars and adapted to move toward and away from said trough, a cover hinged to the trough, and operative connections between said cover and cross-bar.

2. In a salt trough, parallel horizontal bars spaced apart and lying in the same horizontal plane, a trough mounted on said bars, a cross-bar slidably mounted on said bars and adapted to move toward and away from said trough, a cover hinged to the trough, a rod secured to the cover, and rods connecting the aforementioned rod and the cross-bar.

3. A salt trough comprising a frame having horizontal bars, a cross-bar slidably mounted on said bars, a trough removably engaging the horizontal bars, a cover hinged to the trough, a rod secured to the cover and having upwardly extending ends with laterally extending projections, and rods connecting said cross-bar and the projections aforesaid.

4. A salt trough comprising a frame having horizontal bars arranged parallel to one another, the trough mounted on said bars, a cross-bar slidably mounted on said bars and movable toward and from said trough, a cover hinged on the edge of the trough farthest removed from the cross-bar aforesaid, a rod secured to the cover and having upwardly extending ends with laterally extending projections, and rods pivotally secured to said cross-bar and to the projections aforesaid.

In testimony whereof I hereto affix my signature in the presence of two witnesses.

WILLIAM A. COGDILL.

Witnesses:
 ROBERT S. LIGGETT,
 JAMES M. SMITH.

Copies of this patent may be obtained for five cents each, by addressing the "Commissioner of Patents, Washington, D. C."